United States Patent
Patil (10) Patent No.: US 8,864,036 B2
(45) Date of Patent: Oct. 21, 2014

(54) APPARATUS AND METHOD FOR FINDING TARGET DISTANCE FROM BARODE IMAGING SCANNER

(75) Inventor: Ramanagouda Patil, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 144 days.

(21) Appl. No.: 13/544,024

(22) Filed: Jul. 9, 2012

(65) Prior Publication Data

US 2014/0008440 A1    Jan. 9, 2014

(51) Int. Cl.
   *G06K 9/24* (2006.01)

(52) U.S. Cl.
   USPC ................................. 235/462.21; 235/462.22

(58) Field of Classification Search
   CPC .......... G06K 7/10702; G06K 7/10732; G06K 7/2207
   USPC ........................................ 235/462.2–23, 454
   See application file for complete search history.

(56) References Cited

U.S. PATENT DOCUMENTS

| | | | |
|---|---|---|---|
| 6,060,722 A | 5/2000 | Havens et al. | |
| 7,044,374 B2 | 5/2006 | Allison et al. | |
| 7,163,150 B2 | 1/2007 | Kricorissian et al. | |
| 7,164,955 B2 | 1/2007 | Moreas et al. | |
| 7,182,260 B2 | 2/2007 | Gurevich et al. | |
| 7,597,263 B2 | 10/2009 | Vinogradov et al. | |
| 7,909,257 B2 * | 3/2011 | Wang et al. | 235/462.45 |
| 7,967,206 B2 | 6/2011 | Lopez et al. | |
| 8,083,147 B2 * | 12/2011 | Aker et al. | 235/462.42 |
| 8,479,993 B2 * | 7/2013 | Goren | 235/462.2 |
| 2004/0211836 A1 | 10/2004 | Patel et al. | |
| 2010/0078481 A1 | 4/2010 | Trajkovic et al. | |
| 2010/0147947 A1 * | 6/2010 | Aker et al. | 235/454 |

* cited by examiner

*Primary Examiner* — Daniel St Cyr
(74) *Attorney, Agent, or Firm* — Nong-Qiang Fan (57) ABSTRACT

An apparatus includes an imaging sensor having photosensitive elements for detecting light from the target object through an imaging lens arrangement to create first pixel data during a first time period when the extended aiming pattern is projected on the target object. The apparatus also includes a controller for processing the first pixel data to estimate a feature-size of the extended aiming pattern in an image of the target object when the imaging lens arrangement is at a predetermined focus length, and further processing the feature-size along with the predetermined focus length to determine a distance characterizing the separation between the target object and the imaging lens arrangement.

20 Claims, 9 Drawing Sheets

| INDEX | CAMERA RESOLUTION | FOCUS VALUE | ZOOM VALUE | CROSS-WIRE WIDTH & HEIGHT (IN PIXELS) | ACTUAL DISTANCE FROM TARGET 'd' (RESOLUTION OF 10 mm) |
|---|---|---|---|---|---|
| 1 | 640x480 | 5 | 4 | w=220 h=200 | 200 mm |
| 2 | 640x480 | 5 | 4 | w=200 h=180 | 210 mm |
| 3 | 640x480 | 5 | 4 | w=180 h=160 | 220 mm |
| 4 | 640x480 | 5 | 4 | w=160 h=140 | 230 mm |

APPARATUS AND METHOD FOR FINDING TARGET DISTANCE FROM BARODE IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

SUMMARY

In one aspect, the invention is directed to an apparatus. The apparatus includes an aiming pattern generating element, and an aiming light source configured to project visible light through the aiming pattern generating element to generate an extended aiming pattern on a target object. The extended aiming pattern includes at least one line of visible illumination. The apparatus also includes an imaging sensor having photosensitive elements for detecting light from the target object through an imaging lens arrangement to create first pixel data during a first time period when the extended aiming pattern is projected on the target object. The apparatus still includes a controller for processing the first pixel data to estimate a feature-size measuring the at least one line of visible illumination in an image of the target object when the imaging lens arrangement is at a predetermined focus length, and further processing the feature-size along with the predetermined focus length to determine a distance characterizing the separation between the target object and the imaging lens arrangement.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
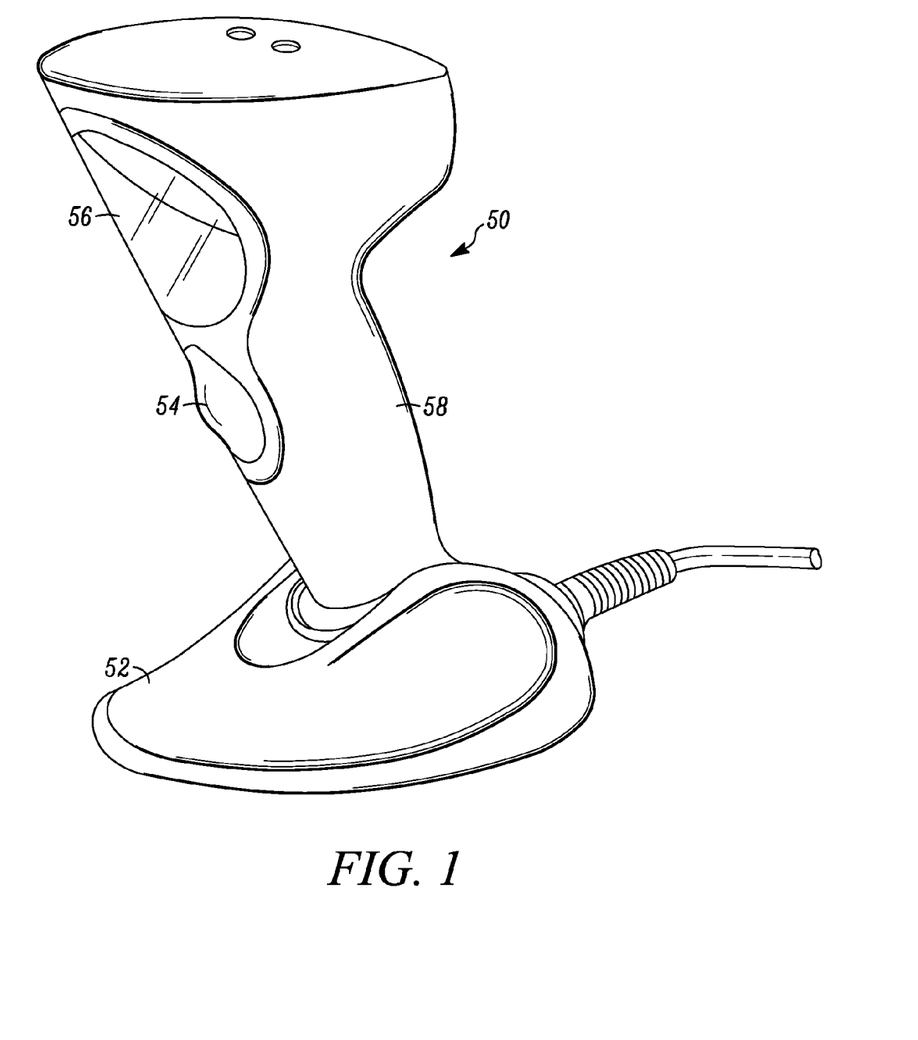
FIG. 1 shows an imaging scanner in accordance with some embodiments.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
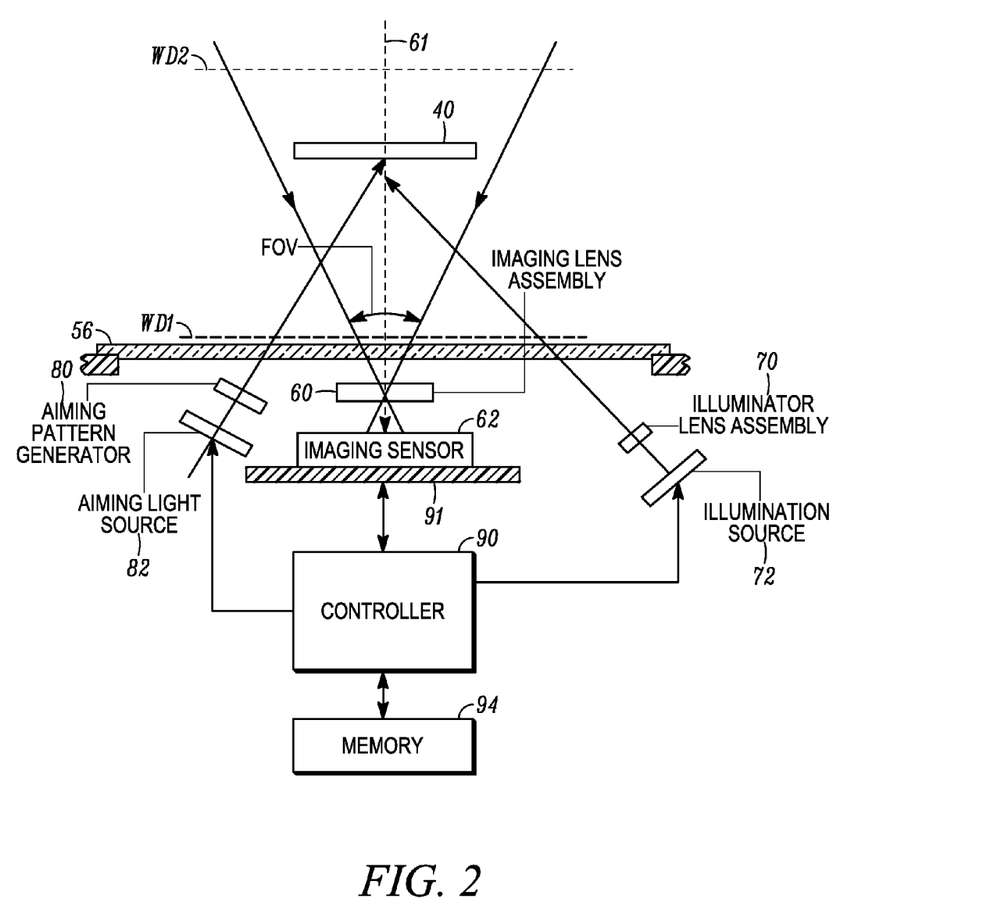
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
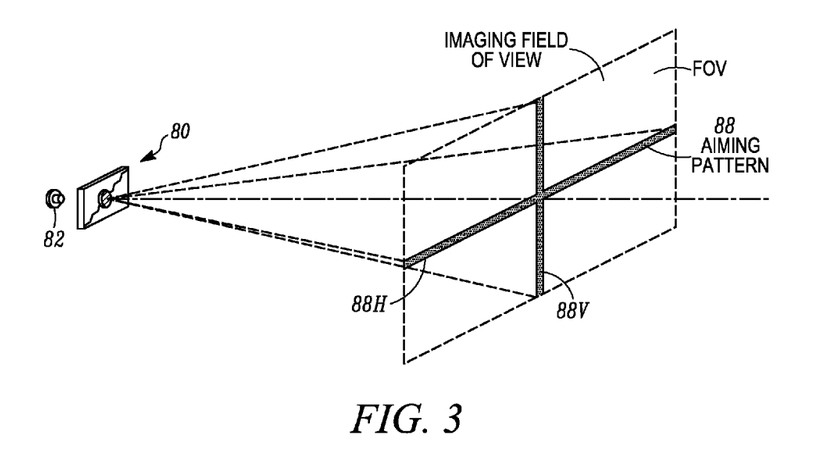
FIG. 3 shows that an aiming pattern is generated within the imaging field of view (FOV) when the visible light from the aiming light source is projected through the aiming pattern generating element in accordance with some embodiments.

Barcode imaging scanners typically project a bright aiming pattern (e.g., a dot, line, cross pattern, etc.) to assist the user in aiming the scanner towards the barcode. When aimed properly, the aiming pattern will be projected onto the desired barcode. As shown in FIG. 3, an aiming pattern 88 can be generated within the imaging field of view (FOV) when the visible light from the aiming light source is projected through the aiming pattern generating element 80. In FIG. 3, the aiming pattern 88 is in the form of an aiming cross-wire that includes two lines of visible illumination: a horizontal line of visible illumination 88H and a vertical line of visible illumination 88V.

Figure 4:
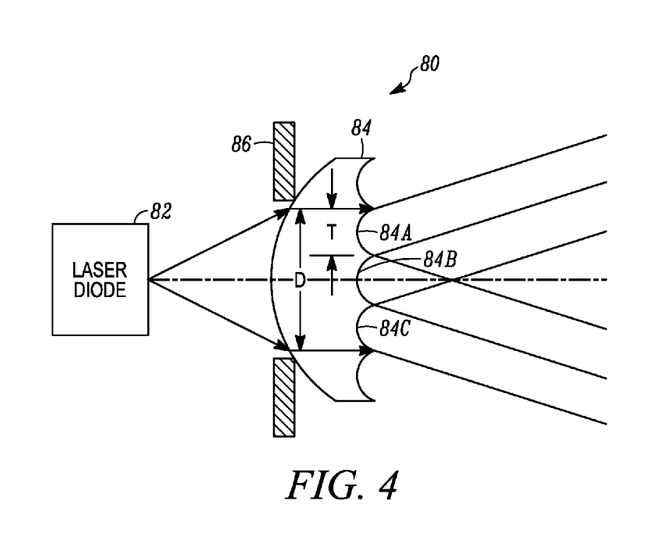
FIG. 4 shows that the aiming pattern generating element can include an aperture stop and an optical component in accordance with some embodiments.

In one implementation, as shown in FIG. 4, the aiming pattern generating element 80 includes an aperture stop 86 and an optical component 84. The optical component 84 in FIG. 4 is a refractive optical element (ROE). Specifically, in one implementation, the rear portion of the optical component 84 is formed with a plurality of refractive structures (e.g., 84A, 84B, 84C, . . . ) for refracting the light beam from the laser diode 82. There are many possible implementations of the optical component 84. Some implementations of the optical component 84—including the implementation as shown in FIG. 4—are described in more detail in U.S. Pat. No. 7,182,260, titled "Aiming light pattern generator in imaging readers for electro-optically reading indicia." The entire content U.S. Pat. No. 7,182,260 is hereby incorporated by reference. In some other embodiments, the optical component 84 in FIG. 4 can also be a diffractive optical element (DOE) that includes a plurality of interferometric elements for generating the aiming pattern by light interference. Some implementations of the diffractive optical element (DOE) are described in more detail in U.S. Pat. No. 6,060,722, which is hereby incorporated by reference in its entirety.

Figure 5A:
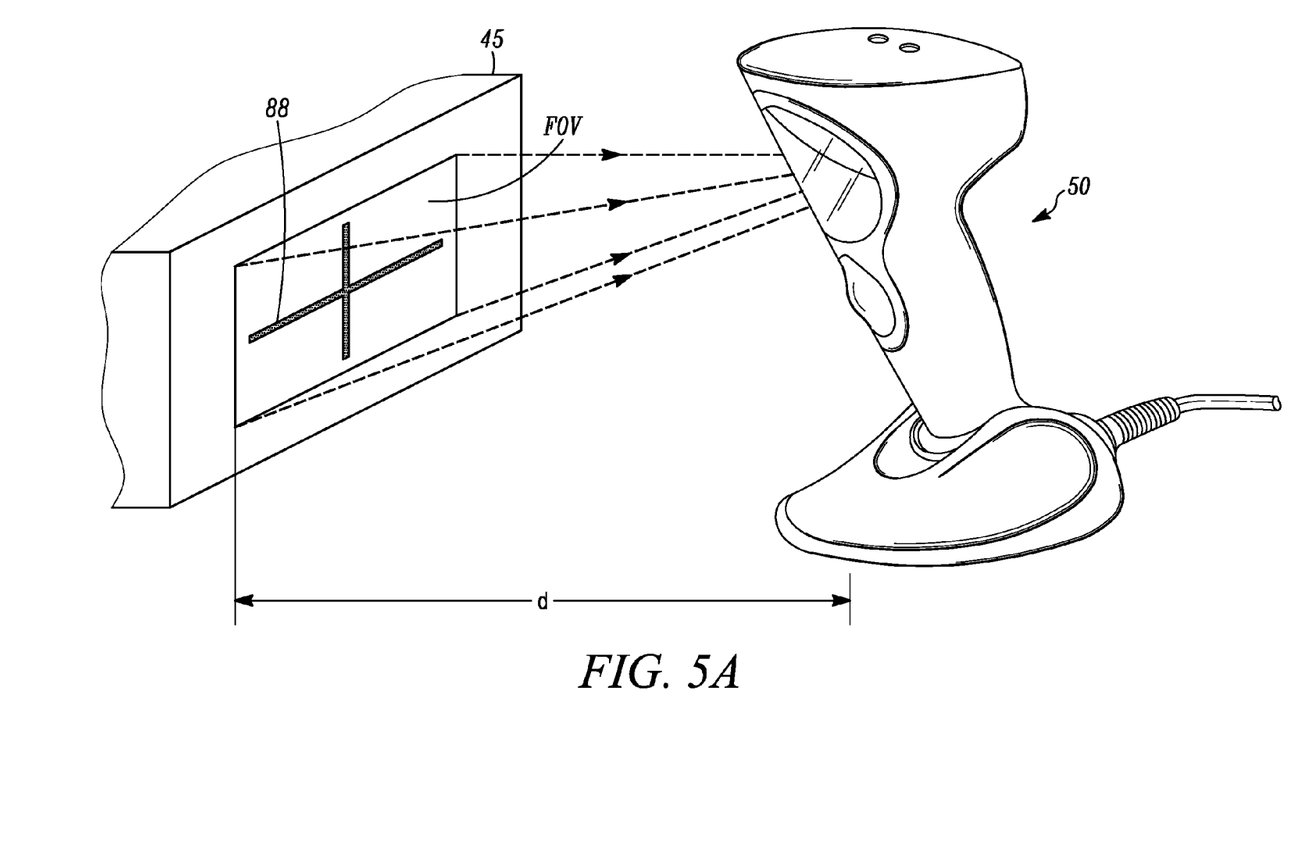
FIG. 5A shows that an image of the aiming pattern is captured by the imaging sensor when the aiming pattern is projected on the surface of a target object.
Figure 5B:
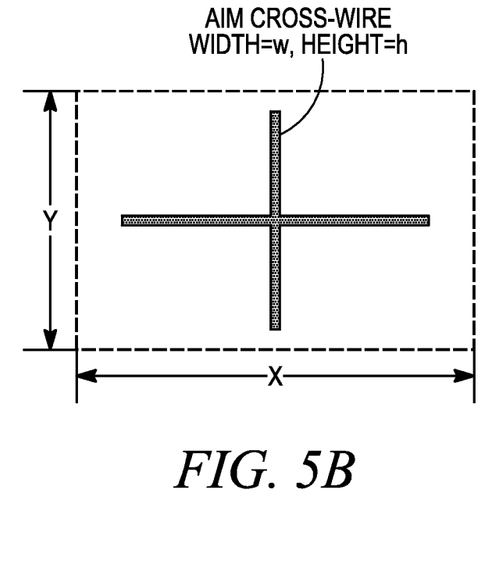
FIG. 5B or FIG. 5C illustrate the image of an aiming cross wire in the form of pixel data as captured by the imaging sensor.
Figure 5C:
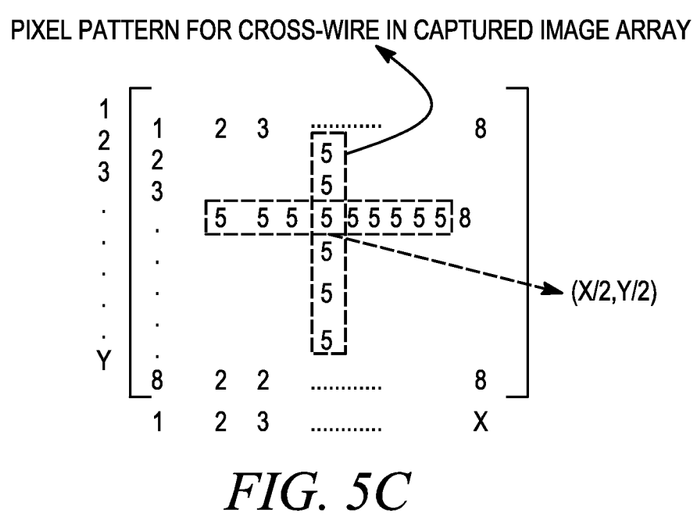

As shown in FIG. 5A, when the aiming pattern 88 is projected on the surface of a target object 45, an image of the aiming pattern 88 can be captured by the imaging sensor 62 to create some pixel data during an exposure time period. In one implementation, the aiming pattern 88 is in the form of an aiming cross wire. The pixel data, as shown in FIG. 5B or FIG. 5C, includes the image of the aiming cross-wire with a width "w" and a height "h"; the pixel data has a horizontal resolution "X" and vertical resolution "Y". The width "w" and the height "h" of the aiming cross-wire as measured in term of the number of pixels generally depends upon the focus lengths "F" and the zoom settings "Z" of the imaging lens arrangement 60 in front of the imaging sensor 62 (e.g., as shown in FIG. 2). The width "w" and the height "h" of the aiming cross-wire, however, generally remains at the same constant, if the distance "d" between the target object 45 and the imaging scanner 50 is kept at a constant, for the same the focus lengths "F" and the same zoom settings "Z" of the imaging lens arrangement 60. Consequently, for an imaging lens arrangement 60 that has variable focuses and/or more than one zoom setting, if the focus lengths "F" and the same zoom settings "Z" are known or predetermined, it would be possible to use the feature-size of the aiming cross-wire in the pixel data (e.g., the width "w" or the height "h") to determine the distance "d" between the target object 45 and the imaging scanner 50. The feature-size of the aiming cross-wire in the pixel data (e.g., the width "w" or the height "h") can be estimated using some known algorithms. In one very specific example as shown in FIG. 5C, the pixel intensity of the aiming cross-wire has a substantially same value "5" which also stands out distinguishably from the other pixel intensities, and the contour of the aiming cross-wire in the pixel data can be readily determined.

For the purpose of determining the distance "d" between the target object 45 and the imaging scanner 50, a lookup table can be first created in a calibration process before the imaging scanner 50 is used in normal operation for decoding a barcode. To create the lookup table, for each selected focus length "F" and/or selected zoom setting "Z," the images of the aiming cross-wire are captured at several selected distances between the target object 45 and the imaging scanner 50 to generate a set of pixel data for each particular system setting. For each of these selected distances, the feature-size of the aiming cross-wire in the pixel data (e.g, the width "w" or the height "h") is estimated from the corresponding pixel data and stored into the lookup table. When the lookup table is completed, the lookup table are indexed with the focus lengths "F" and/or the zoom settings "Z, and for each given focus length "F" and/or given zoom setting "Z," each of the several distances is paired with a corresponding feature-size of the aiming cross-wire in the pixel data (e.g., the width "w" or the height "h").

Figure 6:
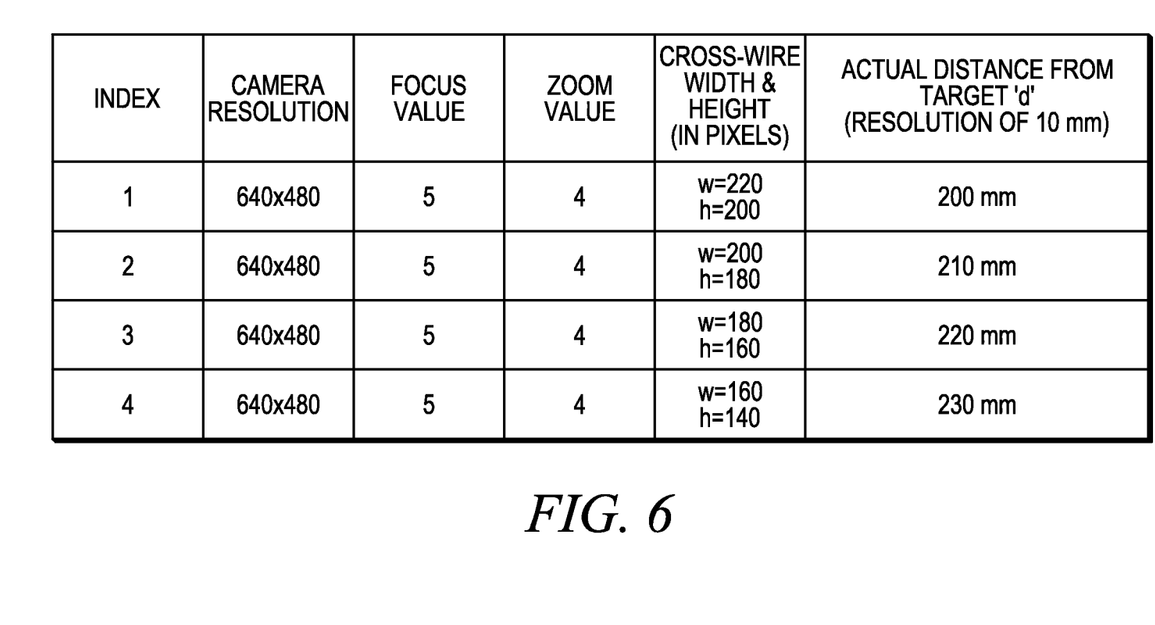
FIG. 6 shows a sub-table selected from the lookup table that includes multiple entries each indentifying a paired relationship between a feature-size of the aiming cross-wire and a corresponding the distance "d" between the target object and the imaging scanner in accordance with some embodiments.

In operation, an extended aiming pattern such as an aiming cross-wire is projected on a target object, and light from the target object, after passing through the imaging lens arrangement, is detected with imaging sensor to create first pixel data during a first time period. The first pixel data is then processed to estimate a feature-size (e.g., the width "w" or the height "h") in the image of the target object when the imaging lens arrangement is at a predetermined focus length and/or at a predetermined zoom setting. Using the value of the predetermined focus length and the predetermined zoom setting as indexes for the lookup table previously created during the calibration process, a controller in the imaging scanner 50 can select a sub-table from the lookup table that includes multiple entries each indentifying a paired relationship between a feature-size of the aiming cross-wire and a corresponding the distance "d" between the target object 45 and the imaging scanner 50. In one specific example as shown in FIG. 6, when the predetermined focus length has a value of 5 and the predetermined zoom has a value of 4, the selected sub-table has four entries with the corresponding the distance "d" being equal to 200 mm, 210 mm, 220 mm, and 230 mm. In one exemplar system setting, if the estimated width "w" and the estimated height "h" are respectively equal to 180 and 160, the controller can determine from the selected sub-table that the distance "d" between the target object 45 and the imaging scanner 50 is most likely around 220 mm.

Once the distance "d" between the target object 45 and the imaging scanner 50 is known, the controller can set the focus length "F" of the imaging lens arrangement to the correct value to bring the image of any barcode on the target object 45 into a better focus. The controller can also set the zoom setting "Z" of the imaging lens arrangement to the correct value for creating an image of the barcode with the desired resolution. After the imaging lens arrangements is set with the correct focus length and the correct zoom setting, the barcode is illuminated with the illumination, and light from the barcode, after passing through the imaging lens arrangement, is detected with imaging sensor to create second pixel data during a second time period. The second pixel data is then processed to decode an image of the barcode.

Figure 7A:
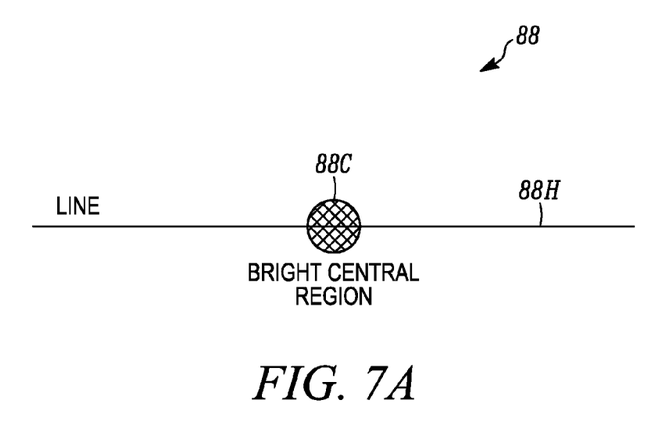
FIGS. 7A-7B depict two exemplar extended aiming patterns that can also be used for finding the distance "d" between the target object and the imaging scanner in accordance with some embodiments.
Figure 7B:
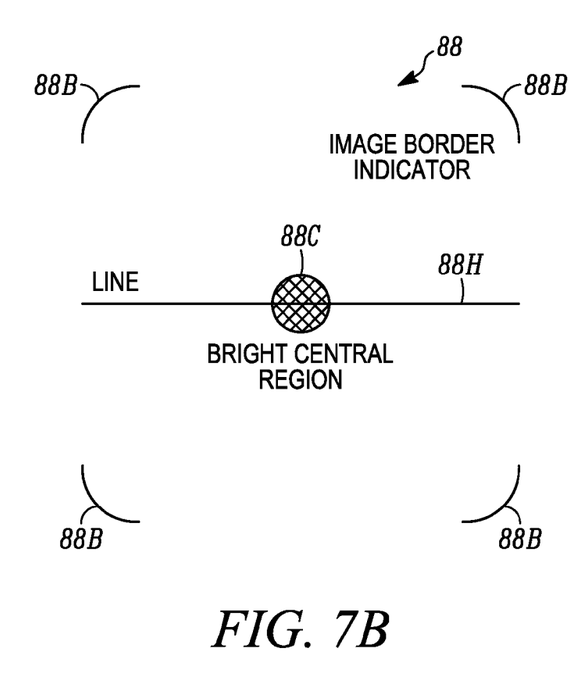

In some implementations, the distance "d" between the target object 45 and the imaging scanner 50 can be a distance characterizing the separation between the target object and the imaging lens arrangement. Such distance "d" can be the linear distance between the target object and the imaging lens arrangement. Such distance "d" can be the linear distance between the target object and the imaging sensor 62. Such distance "d" can be the linear distance between the target object and the window 56 of the imaging scanner. Such distance "d" can be other distance that is determinable from the linear distance between the target object and the imaging lens arrangement. In addition to the aiming cross-wire as shown FIG. 3 and FIGS. 5A-5C, other kind of extended aiming patterns can also be used for finding the distance "d" between the target object 45 and the imaging scanner 50. FIGS. 7A-7B depict two exemplar extended aiming patterns that can also be used for finding the distance "d." The extended aiming pattern 88 in both FIG. 7A and FIG. 7B have a horizontal line 88H and a bright central region 88C, with the extended aiming pattern 88 in FIG. 7B include additional border marks 88B.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   an aiming pattern generating element;
   an aiming light source configured to project visible light through the aiming pattern generating element to generate an extended aiming pattern on a target object, the extended aiming pattern including at least one line of visible illumination;
   an illumination source operative to generate an illumination light projected towards a barcode on the target object;
   an imaging lens arrangement that has variable focuses;
   an imaging sensor having photosensitive elements for detecting light from the target object through the imaging lens arrangement to create first pixel data during a first time period when the extended aiming pattern is projected on the target object, and for detecting light from the barcode through the imaging lens arrangement to create second pixel data during a second time period when the barcode is illuminated by the illumination light; and
   a controller for processing the first pixel data to estimate a feature-size measuring the at least one line of visible illumination in an image of the target object when the imaging lens arrangement is at a predetermined focus length, and further processing the feature-size along with the predetermined focus length to determine a distance characterizing the separation between the target object and the imaging lens arrangement.

2. The apparatus of claim 1, wherein the controller is further configured for processing the second pixel data to decode an image of the barcode.

3. The apparatus of claim 1, wherein the feature-size is the number of pixels of the at least one line of visible illumination in the image of target object.

4. The apparatus of claim 1, further comprising:
   a memory storing a lookup table for finding the distance from the feature-size and the predetermined focus length.

5. The apparatus of claim 1, wherein the extended aiming pattern comprises a cross-wire pattern including a first line of visible illumination and a second line of visible illumination that crosses the first line of visible illumination and wherein said processing the first pixel data comprises:
   processing the first pixel data to estimate a first feature-size measuring the first line of visible illumination in the image of target object and a second feature-size measuring the second line of visible illumination in the image of target object.

6. The apparatus of claim 5, further comprising:
   a memory storing a lookup table for finding the distance from the first feature-size, the second feature-size, and the predetermined focus length.

7. The apparatus of claim 1, wherein the distance characterizing the separation between the target object and the imaging lens arrangement is the distance between the target object and the imaging lens arrangement.

8. The apparatus of claim 1, wherein the distance characterizing the separation between the target object and the imaging lens arrangement is determinable from the distance between the target object and the imaging lens arrangement.

9. The apparatus of claim 1, wherein the distance characterizing the separation between the target object and the imaging lens arrangement is the distance between the target object and the imaging sensor.

10. The apparatus of claim 1, wherein the aiming pattern generating element comprises at least one of a refractive optical element (ROE) and a diffractive optical element (DOE).

11. An apparatus comprising:
    an aiming pattern generating element;
    an aiming light source configured to project visible light through the aiming pattern generating element to generate an extended aiming pattern on a target object, the extended aiming pattern including at least one line of visible illumination;
    an illumination source operative to generate an illumination light projected towards a barcode on the target object;
    an imaging lens arrangement that has variable focuses and more than one zoom setting;
    an imaging sensor having photosensitive elements for detecting light from the target object through the imaging lens arrangement to create first pixel data during a first time period when the extended aiming pattern is projected on the target object, and for detecting light from the barcode through the imaging lens arrangement to create second pixel data during a second time period when the barcode is illuminated by the illumination light;

a controller for processing the first pixel data to estimate a feature-size measuring the at least one line of visible illumination in an image of the target object when the imaging lens arrangement is at a predetermined focus length and at a predetermined zoom setting, and further processing the feature-size along with the predetermined focus length and the predetermined zoom setting to determine a distance characterizing the separation between the target object and the imaging lens arrangement.

12. The apparatus of claim 11, further comprising:
a memory storing a lookup table for finding the distance from the feature-size, the predetermined focus length, and the predetermined zoom setting.

13. A method comprising:
projecting visible light through an aiming pattern generating element to generate an extended aiming pattern on a target object, the extended aiming pattern including at least one line of visible illumination;
detecting light from the target object through an imaging lens arrangement with an imaging sensor having photosensitive elements for to create first pixel data during a first time period when the extended aiming pattern is projected on the target object;
processing the first pixel data to estimate a feature-size measuring the at least one line of visible illumination in an image of the target object when the imaging lens arrangement is at a predetermined focus length;
processing the feature-size along with the predetermined focus length to determine a distance characterizing the separation between the target object and the imaging lens arrangement;
projecting an illumination light towards a barcode on the target object; and
detecting light from the barcode through the imaging lens arrangement with the imaging sensor to create second pixel data during a second time period when the barcode is illuminated by the illumination light.

14. The method of claim 13, further comprising:
processing the second pixel data to decode an image of the barcode.

15. The method of claim 13, wherein the feature-size is the number of pixels of the at least one line of visible illumination in the image of target object.

16. The method of claim 13, further comprising:
finding the distance from the feature-size and the predetermined focus length in a lookup table.

17. The method of claim 13, wherein the extended aiming pattern comprises a cross-wire pattern including a first line of visible illumination and a second line of visible illumination that crosses the first line of visible illumination, and wherein said processing the first pixel data comprises:
processing the first pixel data to estimate a first feature-size measuring the first line of visible illumination in the image of target object and a second feature-size measuring the second line of visible illumination in the image of target object.

18. The method of claim 17, further comprising:
finding the distance from the first feature-size, the second feature-size, and the predetermined focus length in a lookup table.

19. The method of claim 17,
wherein said processing the first pixel data comprises processing the first pixel data to estimate a feature-size measuring the at least one line of visible illumination in the image of the target object when the imaging lens arrangement is at the predetermined focus length and at a predetermined zoom setting; and
wherein said processing the feature-size comprises processing the feature-size along with the predetermined focus length and the predetermined zoom setting to determine the distance characterizing the separation between the target object and the imaging lens arrangement.

20. The method of claim 13, wherein the aiming pattern generating element includes at least one of a refractive optical element (ROE) and a diffractive optical element (DOE).

* * * * *